US009577565B2

(12) United States Patent
Otsubo

(10) Patent No.: US 9,577,565 B2
(45) Date of Patent: Feb. 21, 2017

(54) MOTOR CONTROL DEVICE AND METHOD FOR CONTROLLING THE SAME

(71) Applicant: Masahiro Otsubo, Tokyo (JP)

(72) Inventor: Masahiro Otsubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/652,854

(22) PCT Filed: Feb. 12, 2013

(86) PCT No.: PCT/JP2013/053276
§ 371 (c)(1),
(2) Date: Jun. 17, 2015

(87) PCT Pub. No.: WO2014/125571
PCT Pub. Date: Aug. 21, 2014

(65) Prior Publication Data
US 2015/0333688 A1 Nov. 19, 2015

(51) Int. Cl.
H02P 6/00 (2016.01)
H02P 27/08 (2006.01)
H02M 1/44 (2007.01)
H02M 7/5395 (2006.01)
H02M 7/5387 (2007.01)

(52) U.S. Cl.
CPC ............ H02P 27/08 (2013.01); H02M 1/44 (2013.01); H02M 7/5395 (2013.01); H02M 7/53873 (2013.01)

(58) Field of Classification Search
CPC ............ H02M 7/5395; G05B 2219/21126; H02P 27/08
See application file for complete search history.

(56) References Cited

U.S. PATENT DOCUMENTS

2015/0244246 A1* 8/2015 Krueger ............... H02M 1/00
363/21.17

FOREIGN PATENT DOCUMENTS

JP 02-036762 A 2/1990
JP 2000-270559 A 9/2000
(Continued)

OTHER PUBLICATIONS

International Search Report of PCT/JP2013/053276 dated May 21, 2013.

Primary Examiner — Karen Masih
(74) Attorney, Agent, or Firm — Sughrue Mion, PLLC; Richard C. Turner

(57) ABSTRACT

When detecting an amount of noise current generated in an inverter and flowing into a noise filter, sampling the detection values with an interval of a carrier frequency, determining whether envelope curves of respective sampled values are deemed to be constant, and in a case where the envelope curves of the sampled values are deemed to be constant, the motor control device changes the carrier frequency to another frequency that does not overlap a cutoff frequency fr of the noise filter, or to another frequency that is not close to the cutoff frequency fr of the noise filter. Due to this configuration, even when the noise filter incorporated in the motor control device is a noise filter that is manufactured without demanding any special measures to be taken to the manufacturers and is manufactured with specifications of noise filter manufacturers, a desired noise reduction effect can be obtained.

4 Claims, 4 Drawing Sheets

(56) References Cited

FOREIGN PATENT DOCUMENTS

| | | |
|---|---|---|
| JP | 2004-032938 A | 1/2004 |
| JP | 2004-260963 A | 9/2004 |
| JP | 2010-148158 A | 7/2010 |

* cited by examiner (A) CASE OF fc=fr (B) CASE OF fc≠fr

MOTOR CONTROL DEVICE AND METHOD FOR CONTROLLING THE SAME

CROSS REFERENCE TO RELATED APPLICATIONS

This is a National Stage of International Application No. PCT/JP2013/053276 filed Feb. 12, 2013, the contents of which are incorporated herein by reference in its entirety.

FIELD

The present invention relates to a motor control device having a noise filer incorporated therein and a method for controlling the motor control device.

BACKGROUND

A motor control device that drives and controls an alternating-current motor includes a converter that converts alternating-current power into direct-current power and an inverter that switches the direct-current power converted and generated by the converter to convert the direct-current power into alternating-current power for motor driving. In the inverter, however, noise is generated by switching operations of semiconductor switching elements. This noise is conductive noise that propagates to outside via a power line and causes influences on peripheral devices.

Therefore, conventionally, there has been a technique in which a noise filter is provided on a connection terminal of a power line of a motor control device to reduce leakage of generated conductive noise to the power line (for example, Patent Literature 1).

In the international EMI standards related to conductive noise generated in the motor control device, the leakage amount of conductive noise to the power line is regulated within a bandwidth of 150 kilohertz to 30 megahertz. The bandwidth of 150 kilohertz to 30 megahertz is normally a frequency range much higher than a bandwidth of a carrier frequency used for causing an inverter of a motor control device to perform switching operations with PWM signals.

Meanwhile, a noise filter has a configuration of a low-pass filter that passes a signal without attenuating it in a low-frequency area, and the cutoff frequency (frequency at which attenuation begins) of the noise filter is normally lower than a carrier frequency of a motor control device; however, manufacturers of such noise filters design noise filters while paying attention only to attenuation values around 150 kilohertz, but without paying much attention to the cutoff frequency thereof.

That is, the attenuation rate and the cutoff frequency of noise filters are different depending on the noise filter manufacturers, and thus, when such noise filters are combined with settings of different manufactures and users of motor control devices, the following problem occurs.

Specifically, when the amount of conductive noise generated by a motor control device is large, manufacturers and users of motor control devices select and use a noise filter having a large noise attenuation rate at a bandwidth of equal to or larger than 150 kilohertz. Meanwhile, as for noise filters designed by noise filter manufacturers having a large noise attenuation rate at a bandwidth of equal to or larger than 150 kilohertz, there is a case where the cutoff frequency thereof is made close to the carrier frequency of a motor control device.

When such a noise filter is incorporated in a motor control device that generates large conductive noise, in the motor control device, magnetic saturation is caused in a ferrite core of a common mode coil functioning as an inductor constituting the noise filter, and thus there is a case where a desired noise attenuation effect cannot be obtained.

CITATION LIST

Patent Literature

Patent Literature 1: Japanese Patent Application Laid-open No. H2-36762

SUMMARY

Technical Problem

Conventionally, in order to cope with such a problem, noise filter manufacturers have employed measures for avoiding magnetic saturation in a core of a common mode coil. Specifically, there are measures for changing the cutoff frequency of a noise filter such as (1) reducing the number of windings on a ferrite core of a common mode coil of a noise filter, reducing the inductance of one inductor, and setting the inductors to be multi-staged, that is, setting the ferrite core to be multi-staged, (2) enlarging the cross-sectional area of the core of a common mode coil, and (3) replacing the ferrite core having a small magnetic saturation density with an amorphous core.

However, by setting a ferrite core of a common mode coil to be multi-staged, enlarging the cross-sectional area of the ferrite core, or using a core made of an amorphous material having a high magnetic saturation density, the size of the inductor becomes large and the material cost of the core becomes expensive. Therefore, manufacturers and users of motor control device selecting and using such noise filters face problems such as upsizing of devices and increase in cost.

The present invention has been achieved in view of the above problems, and an object of the present invention is to provide a motor control device that can be used without causing magnetic saturation in a ferrite core of a common mode coil even when the motor control device has incorporated therein a noise filter manufactured with conventional specifications, without demanding noise filter manufacturers to take any special measures, and to provide a method for controlling the motor control device.

Solution to Problem

In order to solve the aforementioned problems, a motor control device having incorporated therein a noise filter that prevents noise generated in a PWM control inverter from leaking to an alternating-current power source according to one aspect of the present invention is constructed to include: a control function of changing a carrier frequency to another frequency when a cutoff frequency of the noise filter overlaps the carrier frequency that is a frequency of a triangular-wave carrier signal used for generating a PWM signal, or when the cutoff frequency is close to the carrier frequency.

Advantageous Effects of Invention

According to the present invention, the motor control device can be used without causing magnetic saturation in ferrite cores of a common mode coil even when the motor control device has incorporated therein a noise filter manufactured with conventional specifications, without demanding noise filter manufacturers to take any special measures. Therefore, because the cost of the noise filter incorporated in the motor control device can be suppressed, the device cost can be greatly reduced.

DESCRIPTION OF EMBODIMENTS

Exemplary embodiments of a motor control device and a method for controlling the same according to the present invention will be explained below in detail with reference to the accompanying drawings. The present invention is not limited to the embodiments.

Embodiment

Figure 1:
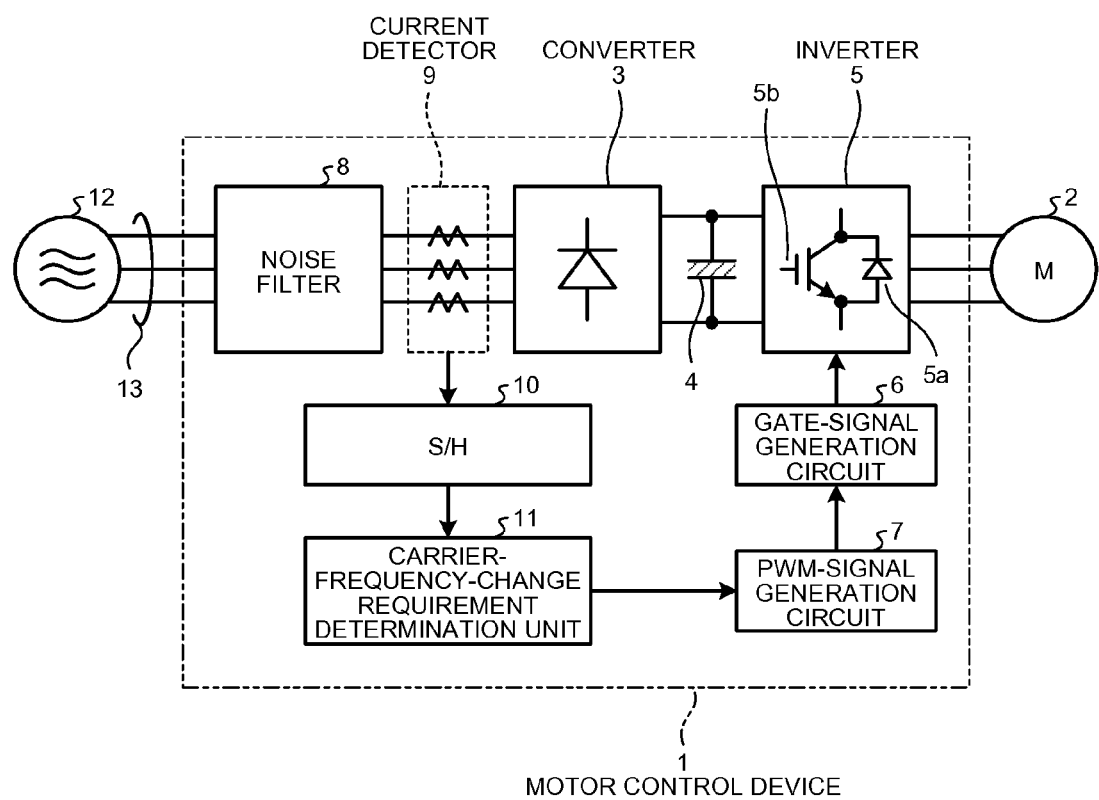
FIG. 1 is a block diagram illustrating a configuration of relevant parts of a motor control device according to an embodiment of the present invention.

FIG. 1 is a block diagram illustrating a configuration of relevant parts of a motor control device according to an embodiment of the present invention. In FIG. 1, in a motor control device 1 according to the present embodiment, in addition to a configuration related to drive control of a motor 2 (in FIG. 1, basic elements such as a converter 3, a capacitor 4, an inverter 5, a gate-signal generation circuit 6, and a PWM-signal generation circuit 7 are illustrated), when a noise filter 8 is incorporated in the motor control device 1, a current detector 9, a sample-hold circuit (S/H) 10, and a carrier-frequency-change requirement determination unit 11 are also included. As illustrated in FIG. 1, the noise filter 8 is provided between an input end of the converter 3 and a device-side connection end of a power cable 13 that is to be connected to an alternating-current power source 12.

First, configurations and operations related to drive control of the motor 2 are briefly described. The converter 3 is a full-wave rectification circuit formed of a diode bridge. In the example illustrated in FIG. 1, the converter 3 performs full-wave rectification on an output (a three-phase alternating-current voltage in the example illustrated in FIG. 1) of the alternating-current power source 12 input through the noise filter 8, thereby to generate a direct-current voltage of a predetermined value. As for the direct-current voltage output from the converter 3, its pulsating component is smoothed by the capacitor 4 to be a constant voltage, and the constant voltage becomes a bus voltage of the inverter 5.

The inverter 5 is constituted by a switching circuit formed of a plurality of power transistors (IGBTs in the example illustrated in FIG. 1) 5b, each being connected to a diode 5a in an inverse-parallel manner. In the present embodiment, in the switching circuit, three sets of arms in each of which a pair of diode 5a and power transistor 5b are connected in series are connected in parallel between a positive-pole bus and a negative-pole bus that are respectively connected to a positive terminal and a negative terminal of the capacitor 4, and one end of each of three upper arms, the other end of which is connected to the positive-pole bus, and one end of each of three lower arms, the other end of which is connected to the positive-pole bus, are made to be output ends, and the motor 2 is connected to each of these output ends.

The PWM-signal generation circuit 7 generates a PWM signal (a pulse-width modulation signal) in which a pulse width changes based on a comparison between a triangular-wave carrier signal of a certain frequency and a speed-command voltage signal, which has a certain inclination and intersects the triangular-wave carrier signal.

The gate-signal generation circuit 6 individually generates a gate signal that is applied on the gate of each of power transistors 5b of the three upper arms and the three lower arms of the switching circuit constituting the inverter 5, based on a PWM signal from the PWM-signal generation circuit 7.

As each of the power transistors 5b of the three upper arms and the three lower arms of the switching circuit individually performs an on/off operation with a gate signal from the gate-signal generation circuit 6, the inverter 5 performs switching on a bus voltage formed by the capacitor 4 to transform an alternating-current drive voltage to the motor 2.

In this case, in the inverter 5, conductive noise is generated by a switching operation of each of the power transistors 5b. The noise filter 8 is provided to prevent the conductive noise generated in the inverter 5 from propagating to outside via a power line and from causing influences on peripheral devices. While illustrations of the configuration of the noise filter 8 are omitted, the noise filter 8 includes a common mode coil, an X capacitor provided between lines, and a Y capacitor provided between a line and earth.

The common mode coil is configured to gain a large inductance by in-phase winding a copper line around a ferrite core, cancelling out magnetic flux of currents flowing into respective coils, and preventing saturation in the ferrite cores. The X capacitor is provided to mainly attenuate normal mode noise, and the Y capacitor is provided to mainly attenuate common mode noise.

Figure 2:
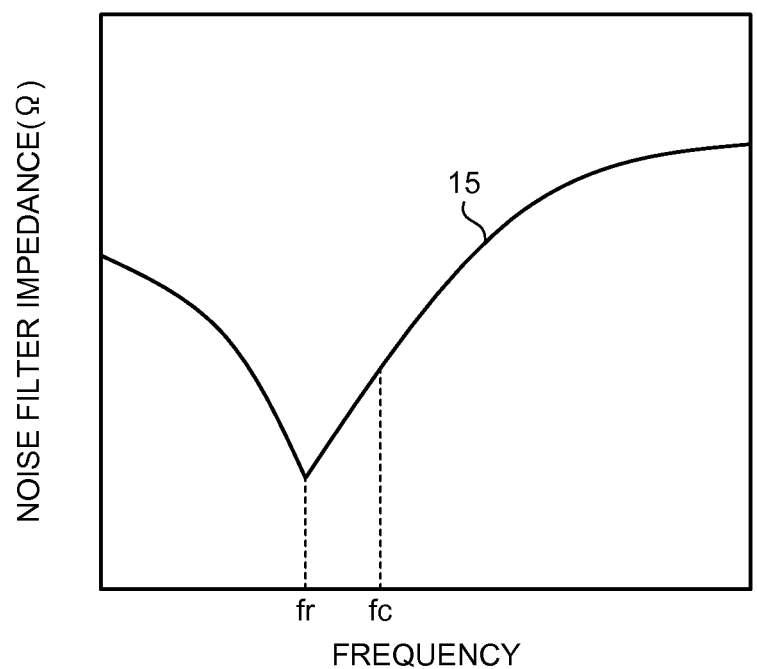
FIG. 2 is a characteristic diagram illustrating an example of impedance characteristics of a noise filter illustrated in FIG. 1.
Figure 3:
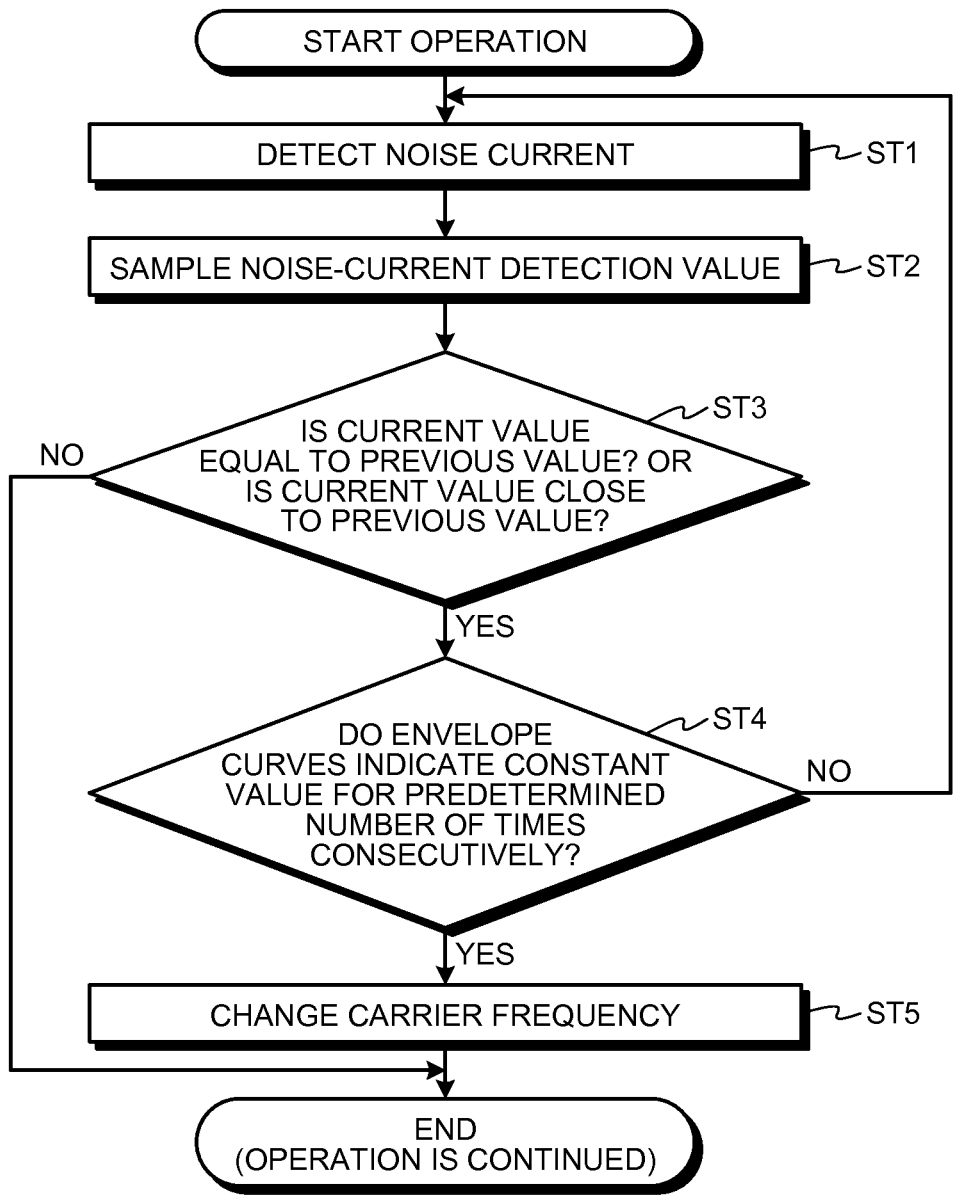
FIG. 3 is a flowchart for explaining an operation of the embodiment.
Figure 4:
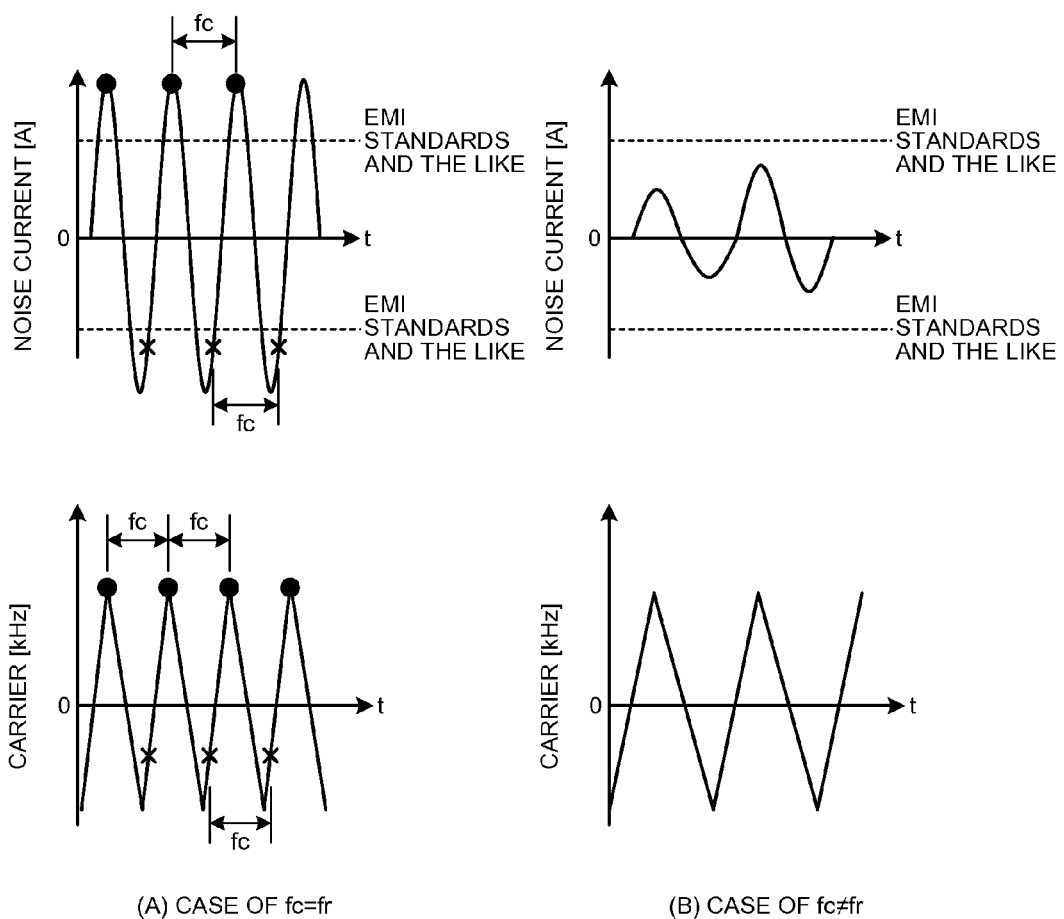
FIG. 4 is a characteristic diagram illustrating a relation between a noise-current detection value and a carrier frequency of the motor control device, where (A) is a case of fc=fr, and (B) is a case of fc≠fr.

Parts relevant to the present embodiment are described below with reference to FIGS. 1 to 4. FIG. 2 is a characteristic diagram illustrating an example of impedance characteristics of the noise filter illustrated in FIG. 1. FIG. 3 is a flowchart for explaining an operation of the present embodiment. FIG. 4 is a characteristic diagram illustrating a relation between a noise-current detection value and a carrier frequency of the motor control device, where (A) is a case of fc=fr, and (B) is a case of fc≠fr.

First, in FIG. 2, the vertical axis represents a noise filter impedance as a logarithm, and indicates that, as the curve moves down, the attenuation rate of the noise filter 8 becomes smaller. In FIG. 2, a frequency fr indicated at the lowermost point in a valley part of an impedance characteristic curve 15 is a cutoff frequency (a frequency at which attenuation begins) of the noise filter 8. A frequency fc indicated at a position of the curve moving up to a high frequency side from the valley part of the impedance characteristic curve 15 is a frequency (a carrier frequency) of a triangular-wave carrier signal used for generating a PWM signal in the PWM-signal generation circuit 7.

Generally, the frequency (the carrier frequency) fc of a triangular-wave carrier signal used for generating a PWM signal is, as illustrated in FIG. 2, in a frequency range higher than the cutoff frequency fr of the noise filter 8. However, manufacturers of the noise filter 8 design noise filters, paying attention only to attenuation values around 150 kilohertz, which is defined in the international EMI standards, but without paying much attention to the cutoff frequency fr.

Therefore, there is a case in which the cutoff frequency fr of the noise filter 8 designed and manufactured by manufacturers of the noise filter 8, taking the international EMI standards into consideration, is made close to the carrier frequency fc of the motor control device 1. Consequently, there is a case in which the noise filter 8 in which the cutoff frequency fr is close to the carrier frequency fc of the motor control device 1 as described above is incorporated in the motor control device 1.

In this case, in the inverter 5, conductor noise is generated in each carrier frequency fc, or generated in each harmonic of the carrier frequency fc. When the carrier frequency fc overlaps the cutoff frequency fr of the noise filter 8, or when the carrier frequency fc is made close to the cutoff frequency fr of the noise filter 8 even though there is no overlapping, a noise current input to the noise filter 8 is amplified by a resonance, and the amplified noise current becomes a large noise current. As a result, there is a case in which large magnetic flux is generated in a common mode coil constituting the noise filter 8, magnetic saturation occurs in the ferrite core of the common mode coil, and a desired noise reduction effect cannot be obtained.

Therefore, in the present embodiment, in order to configure the motor control device 1 such that it can be used without causing magnetic saturation in a ferrite core of a common mode coil and can obtain a desired noise reduction effect, even without any special measures to be taken to the manufacturers of the noise filter 8, but using the noise filter 8 manufactured with specifications of noise filter manufacturers incorporated therein, the current detector 9, the S/H 10, and the carrier-frequency-change requirement determination unit 11 are added in the motor control device 1, and the motor control device 1 is configured such that the carrier frequency fc thereof can be changed to another frequency with, for example, a procedure illustrated in FIG. 3.

That is, in FIG. 3, in step ST1, a noise current flowing into the noise filter 8 from the converter 3 is detected by the current detector 9. In step ST2, in the S/H 10, the noise-current detection value input from the current detector 9 is sampled with an interval of the carrier frequency fc, and the sampled value is output to and held in the carrier-frequency-change requirement determination unit 11.

In step ST3, first, the sampled values output from the S/H 10 and held in the carrier-frequency-change requirement determination unit 11 are sequentially taken in, and the carrier-frequency-change requirement determination unit 11 determines whether the current sampled value is equal to the previous sampled value, or whether the current sampled value is close to the previous sampled value.

As a result of the determination, when the current sampled value is not equal to the previous sampled value, or when the current sampled value is not close to the previous sampled value (NO in step ST3), the present procedure is ended. Note that even in this case, the operation of the motor control device 1 is continued. In this case, it is assumed that the cutoff frequency fr of the noise filter 8 does not overlap the carrier frequency fc, or that the cutoff frequency fr of the noise filter 8 is not close to the carrier frequency fc, and thus resonant amplification is not performed on the noise current flowing into the noise filter 8. Therefore, for example, as illustrated in (B) in FIG. 4, the noise current flowing into the noise filter 8 has low amplitude that is within the range of the EMI standards and the like, and a noise reduction effect of the noise filter 8 can be obtained.

Meanwhile, as a result of the determination in step ST3, when the current sampled value is equal to the previous sampled value, or when the current sampled value is close to the previous sampled value (YES in step ST3), it is assumed that the cutoff frequency fr of the noise filter 8 overlaps the carrier frequency fc, or that the cutoff frequency fr of the noise filter 8 is close to the carrier frequency fc, and thus resonant amplification is performed on the noise current flowing into the noise filter 8. In this case, as illustrated in (A) in FIG. 4, the noise current flowing into the noise filter 8 becomes a current having high amplitude that is beyond the range of the EMI standards and the like. At this time, when a noise-current detection value is sampled with an interval of the carrier frequency fc, sampled values of respective noise currents become equal to or close to one another.

Therefore, at the next step, that is Step ST4, in the carrier-frequency-change requirement determination unit 11, it is confirmed that envelope curves of sampled values of respective noise currents for a predetermined number of times indicate a constant value consecutively. When it is confirmed by repeating a process of ST4: NO→ST1→ST2→ST3:YES→ST4:NO (ST4:YES), at the next step, that is Step ST5, the carrier-frequency-change requirement determination unit 11 issues a request for changing the carrier frequency fc to another frequency to the PWM-signal generation circuit 7, and the present procedure is ended. Note that even in this case, the operation of the motor control device 1 is continued.

In the PWM-signal generation circuit 7, when the carrier frequency fc is changed to a frequency that does not overlap the cutoff frequency fr of the noise filter 8, or is changed to a frequency that is not close to the cutoff frequency fr of the noise filter 8, resonance amplification is not performed on the noise current flowing into the noise filter 8. Therefore, as illustrated in (B) in FIG. 4, the noise current flowing into the noise filter 8 has low amplitude that is within the range of the EMI standards and the like. In the noise filter 8, a ferrite core of a common mode coil is not saturated and demonstrate an originally supposed high inductance state, so that the noise filter 8 can obtain a noise reduction effect.

As described above, according to the present embodiment, the amount of noise current having been generated in an inverter and flowing into a noise filter is detected, the detected value is sampled with an interval of a carrier frequency, whether envelope curves of respective sampled values are deemed to be constant is determined, and when the envelope curves of the respective sampled values are deemed to be constant, the carrier frequency is changed to a frequency that does not overlap the cutoff frequency fr of the noise filter 8, or is changed to a frequency that is not close to the cutoff frequency fr of the noise filter 8.

Due to this configuration, even when the noise filter incorporated in the motor control device is a noise filter that is manufactured with specifications of noise filter manufacturers, but without demanding manufacturers thereof to take any special measures, that is, even when it is a noise filter in which the cutoff frequency overlaps the carrier frequency of the motor control device or the cutoff frequency is close to the carrier frequency, the motor control device can be used without causing magnetic saturation in a ferrite core of a common mode coil, and a desired noise reduction effect can be obtained.

Accordingly, the cost of the noise filter incorporated in the motor control device is suppressed, and the device cost can be greatly reduced.

INDUSTRIAL APPLICABILITY

As described above, the motor control device and the method for controlling the same according to the present invention are both useful as a motor control device that can be used without causing magnetic saturation in a ferrite core of a common mode coil, even without demanding any special measures to be taken to the noise filter manufacturers, and a method for controlling the motor control device.

REFERENCE SIGNS LIST

1 motor control device, 2 motor, 3 converter, 4 capacitor, 5 inverter, 5b power transistor, 6 gate-signal generation circuit, 7 PWM-signal generation circuit, 8 noise filter, 9 current detector, 10 sample-hold circuit (S/H), 11 carrier-frequency-change requirement determination unit, 12 alternating-current power source, 13 power cable.

The invention claimed is:

1. A motor control device having incorporated therein a noise filter that prevents noise generated in a PWM control inverter from leaking to an alternating-current power source, wherein
the motor control device includes
a current detector that detects a noise current flowing into the noise filter,
a sampling unit that samples a noise-current detection value output from the current detector at a cycle of a carrier frequency of a triangular-wave carrier signal used for generating a PWM signal,
a determination unit that compares a current sampled value and a previous sampled value output from the sampling unit to determine whether the compared values are equal to each other or not, or are close to each other or not, and
a carrier-frequency changing unit that changes the carrier frequency to another frequency when a result of determination made by the determination unit indicates that these values are equal to or close to each other.

2. The motor control device according to claim 1, wherein the carrier-frequency changing unit changes the carrier frequency to another frequency when a result of determination made by the determination unit indicates that these values are equal to or close to each other for a plurality of times consecutively.

3. A method for controlling a motor control device having incorporated therein a noise filter that prevents noise generated in a PWM control inverter from leaking to an alternating-current power source side, wherein
the method comprises a controlling step, the controlling step including:
detecting a noise current flowing into the noise filter,
sampling a noise-current detection value detected at the detecting at a cycle of the carrier frequency,
comparing a current sampled value and a previous sampled value acquired at the sampling to determine whether the compared values are equal to each other or not, or are close to each other or not, and
changing the carrier frequency to another frequency when a result of determination at the comparing indicates that these values are equal to or close to each other.

4. The method for controlling a motor control device according to claim 3, wherein the changing includes changing the carrier frequency to another frequency when a result of determination at the comparing indicates that these values are equal to or close to each other for a plurality of times consecutively.

* * * * *